United States Patent [19]

Maurice et al.

[11] Patent Number: 4,490,397

[45] Date of Patent: Dec. 25, 1984

[54] PROCESS FOR THE PRODUCTION OF PROTEIN FIBRES

[75] Inventors: Terrence J. Maurice, Colborne; Jennifer M. Grealy, Gores Landing, both of Canada

[73] Assignee: General Foods Inc., Don Mills, Canada

[21] Appl. No.: 452,702

[22] Filed: Dec. 23, 1982

[51] Int. Cl.$^3$ .............................................. A23J 3/00
[52] U.S. Cl. .................................... 426/276; 426/574; 426/656; 426/661; 426/802
[58] Field of Search ............... 426/104, 276, 656, 802, 426/574, 661

[56] References Cited

U.S. PATENT DOCUMENTS

| | | | |
|---|---|---|---|
| 3,493,386 | 2/1970 | Pyne | 426/276 |
| 3,674,500 | 7/1972 | Hagasawa et al. | 426/656 X |
| 3,772,035 | 11/1973 | Carp et al. | 426/104 X |
| 3,870,801 | 3/1975 | Tombs | 426/276 X |
| 3,900,573 | 8/1975 | Freck et al. | 426/104 X |
| 3,987,213 | 10/1976 | Hawkins | 426/276 X |
| 4,018,903 | 4/1977 | Segeren et al. | 426/104 |
| 4,247,566 | 1/1981 | Inagami et al. | 426/276 |
| 4,296,026 | 10/1981 | Millar | 426/657 X |
| 4,321,280 | 3/1982 | Roy et al. | 426/802 X |
| 4,328,252 | 5/1982 | Murray et al. | 426/276 X |

*Primary Examiner*—Robert Yoncoskie
*Attorney, Agent, or Firm*—Sim & McBurney

[57] ABSTRACT

Smooth, elastic and even protein fibres are formed by extruding a mixture of protein micellar mass (PMM) and gellable starch into hot water. The starch may be present in an amount up to about 30 wt % of the PMM. A wide variety of properties can be achieved by varying the concentration of starch. An increase in fibre strength and elasticity is achieved at low concentrations of starch while softer fibres of increased moisture content result at higher concentrations of starch. The fibres are useful in a variety of food analog products.

23 Claims, No Drawings

PROCESS FOR THE PRODUCTION OF PROTEIN FIBRES

FIELD OF INVENTION

The present invention is concerned with the production of protein fibres.

BACKGROUND OF THE INVENTION

In U.S. Pat. No. 4,328,252, assigned to the assignee herein, the disclosure of which is incorporated herein by reference, there is described a process for the formation of protein fibres in which a protein isolate, known as protein micellar mass, sometimes referred to herein as "PMM", is injected into hot water having a temperature above 90° C. through a plurality of openings.

The novel protein isolate is defined in U.S. Pat. No. 4,285,862, assigned to the assignee of this application, the disclosure of which is incorporated herein by reference, as a substantially undenatured protein isolate product containing at least about 90% by weight of protein (as determined by Kjeldahl nitrogen $\times 6.25$) and in the form of an amorphous protein mass which is formed by settling the solid phase from an aqueous dispersion of protein micelles consisting of homogeneous amphiphilic protein moieties and formed from at least one protein source material, the product having substantially no lipid content, substantially no lysinoalanine content and substantially the same lysine content as the storage protein in the source material.

Such novel protein isolate may be formed by the procedures defined in U.S. Pat. Nos. 4,169,090, 4,208,323, 4,296,026 and 4,307,014, assigned to the assignee herein, the disclosures of which are incorporated herein by reference. In these patents, there are described procedures for isolating protein from protein source materials by solubilizing the protein by contact of the protein source material with sodium chloride solution under critical pH and ionic strength conditions and diluting the protein solution with water to a lower ionic strength to cause the formation of the dispersion of protein micelles in the aqueous phase from which is settled as the amorphous protein micellar mass. The protein solution may be subjected to ultrafiltration prior to the dilution step and the settling may be enhanced by centrifugation.

The process of U.S. Pat. No. 4,169,090 involves solubilizing the protein in the vegetable protein source material at a temperature of about 15° to 35° C. using a food grade salt solution having a concentation of at least 0.2 molar ionic strength and a pH of 5.5 to 6.3 to form a protein solution, and diluting the protein solution to an ionic strength of less than 0.1 molar to cause formation of the dispersion.

The process of U.S. Pat. No. 4,208,323 involves solubilizing the protein in the vegetable protein source material at a temperature of about 15° to about 35° C. using a food grade salt solution having a concentration of at least 0.2 molar ionic strength and a pH of about 5 to about 6.8 to form a protein solution, increasing the protein concentration of the protein solution while maintaining the ionic strength thereof substantially constant, and diluting the concentrated protein solution to an ionic strength below about 0.2 molar to cause formation of the dispersion.

In the latter process, the food grade salt solution preferably has an ionic strength of about 0.2 to about 0.8 molar and a pH of about 5.3 to about 6.2. In addition, the protein concentration step is preferably effected by a membrane technique at a volume reduction factor about 1.1 to about 6.0, as determined by the ratio of volume of protein solution and the volume of concentated protein solution.

Further, the dilution of the concentrated protein solution is preferably effected by passing the concentrated protein solution into a body of water having a temperature below about 25° C. and a volume sufficient to decrease the ionic strength of the concentrated protein solution to a value of about 0.06 to about 0.12 molar.

In one embodiment of the latter process, the food grade salt solution has a pH of about 5 to about 5.5 and the phosphorus content of the protein solution is decreased prior to the dilution step.

The food grade salt used in the above-described solubilization procedures usually is sodium chloride, although other salts, such as, potassium chloride or calcium chloride may be used.

As is set forth in U.S. Pat. No. 4,296,026, the purity of isolate which is obtained from soybeans may be improved by the presence of millimolar amounts of calcium chloride in the aqueous sodium chloride solution. As described therein, the protein is solubilized by contact with an aqueous sodium chloride solution having an ionic strength of at least about 0.2 molar and containing about 0.001 to about 0.01M calcium chloride and having a temperature of about 15° to about 75° C.

Further, as is set forth in U.S. Pat. No. 4,307,014, the yield of isolate which is obtained from soybeans may be improved by effecting the protein solubilization at a temperature of about 15° to about 75° C. using an aqueous food grade salt solution of ionic strength of at least 0.2M and a pH of about 5.6 to about 7.0, preferably about 6.0 to about 6.4, and then adjusting the pH of the protein solution to a pH of about 4.8 to about 5.4, preferably about 5.1 to about 5.3, prior to dilution of the pH-adjusted protein solution.

While the procedure of the aforementioned U.S. Pat. No. 4,238,252 produces protein fibres, the quality of the fibres obtained is sensitive to pH of the PMM and optimum fibre strength and elasticity are obtained only over a narrow range of about 5.6 to 5.7. Further, the range of fibre strength and elasticity, and hence texture variations which can be obtained, is quite narrow.

SUMMARY OF INVENTION

It has now been surprisingly found that smooth, uniform and elastic fibres having a wide variety of textural characteristics may be formed upon extrusion of protein micellar mass through openings into a hot water bath, by the incorporation of a gellable starch into the protein micellar mass prior to injection of the mixture into hot water.

The presence of the starch in admixture with the protein micellar mass also improves significantly the flow properties of the PMM and enables significant control over the process to be exercised and the smooth, uniform and elastic fibres to be obtained in consistent manner. The pH of PMM over which good quality fibres may be formed is also considerably broadened by the presence of the starch in admixture with the PMM.

The concentration of starch present in the PMM affects the quality of fibres which are obtained. Generally, under the same extrusion conditions, lower concentrations of starch tend to produce higher strength elastic fibres having good chewiness, suitable for use in meat analogs, while higher concentrations of starch tend to produce softer, juicier fibres which are useful in seafood analogs.

GENERAL DESCRIPTION OF INVENTION

It has been found that small quantities of gellable starch in the range of about 0.5 to about 5 wt% of the PMM, preferably about 1 to about 2.5 wt% of the PMM, only are required to improve the flow properties of the PMM and to obtain smooth, even and elastic fibres of improved fibre strength. Higher levels of starch up to about 30 wt% may be used to achieve modification of the texture of the fibres produced, with greater concentrations leading to softer fibres of higher water content. The properties of the fibres produced, therefore, may be varied over a wide range by manipulation of the starch concentration.

This variation in properties enables the protein fibres to be used in a variety of meat and sea food analogs. The fibres impart texture and chewiness to the product and may be provided in a form which is very similar to the natural protein fibres present in the product for which the analog is being provided.

The fibres of the invention may be used in simulated adipose tissue, bacon analogs, meat snack analogs, sausage meat and other meat analogs, shrimp and crab meat analogs, soup mixes, stews and casseroles.

The starch which is used in this invention may be any gellable starch material. Cornstarch is preferred, in view of its ready availability, although starches from other materials, for example, tapioca and peas, may be used, if desired.

The protein source from which the PMM is formed is usually a plant protein, including cereals, for example, wheat, corn, oats, rye, barley and triticales, legumes, for example, field peas, chickpeas, fababeans, navy beans and pinto beans, and oil seeds, such as soybeans.

The PMM is made from the source material by the procedures set forth in U.S. Pat. Nos. 4,169,090, 4,208,323, 4,296,026 and 4,307,014 referred to above. It is sometimes beneficial to solubilize the protein material at a higher pH, adjust the pH of the resulting protein solution to a lower value and then precipitate the PMM at the lower pH, so as to take advantage of the higher overall yield attainable at the higher pH of solubilization and the greater moisture content of the PMM material that results at the lower pH of precipitation. Such higher moisture level facilitates incorporation of the starch into the PMM. Adjustment of pH in the solution process is described in the aforementioned U.S. Pat. No. 4,307,014.

The fibres are formed in this invention by extruding the mixtures of PMM and starch through a plurality of openings or a single opening into a bath of a coagulating medium, usually water. In order to achieve fibre formation, the extruded material must be exposed to heat for a sufficient time and at a sufficient temperature effectively to denature the extruded protein in the form of fibre monofilaments which maintain their integrity when removed from the bath.

In order to ensure that the extruded material maintains its structural integrity for a sufficient period to ensure that heat setting occurs, a bath temperature of at least about 90° C. usually is used, preferably, for a water bath, the temperature is at least about 90° C., since rapid penetration of heat into the fibre and rapid denaturation of the protein into distinct fibre monofilaments occurs. The water bath may have a pH of about 5.5 to 7.5.

The presence of starch in the admixture with PMM causes an increase in viscosity of the PMM as well as a decrease in the overall moisture content. Above about 5 wt% starch, heating of the admixture, however, results in a significant decrease in the viscosity of the admixture. It is preferred, at these concentrations of starch, to preheat the admixture to a temperature of about 40° to about 60° C. prior to extrusion of the preheated mixture to the coagulating bath. Such preheating of the PMM-starch mixture may be achieved in any convenient manner, for example, by immersion of the extrusion nozzle in the hot water bath.

Fibres which are produced in accordance with U.S. Pat. No. 4,328,252 exhibit a variation in strength depending on pH of the PMM which is extruded into the hot water, peaking at around pH 5.6 to 5.7. While fibres are produced from PMM over the pH range of 5.55 to 5.85 in the prior procedure, fibres produced from PMM having a pH at the lower end of this range tend to be lumpy and lack strength. The presence of starch in admixture with the PMM results in an approximately uniform strength of fibres over the entire pH range and also the formation of fibres of smooth and uniform appearance.

The diameter of the fibres obtained by the process of the invention may be varied by varying the diameter of the openings through which the PMM and starch mixture is injected into the hot water. Usually, the diameter of the openings is in the range of about 0.005 to about 0.020 inches.

Coloured fibres may be produced by mixing colouring agents in with the PMM and starch admixture prior to extrusion of the fibres. Using isoelectric fibre formation processes, involving extraction of protein at high pH and then extruding into an acid bath, it is usually not possible to colour the fibres in this way, since food colouring agents tend to be pH sensitive materials.

The fibres may be dried without loss of structural integrity, and may be transported or stored in this form. The dehydrated form of the fibres may be used in dry soup mixes or the like. The fibres are readily rehydrated to their initial form without loss of their beneficial properties. Further, the fibres may be frozen wet and thawed without loss of structural integrity.

EXAMPLES

Example 1

This Example illustrates the formation of protein fibres in accordance with this invention.

Soy PMM was formed following the procedure of U.S. Pat. No. 4,208,323. Soybean concentrate (about 50 wt% protein) was mixed with 50 Imperial gallons of 0.35 molar sodium chloride solution at a 15% w/v concentration at a temperature of about 25° C. The mixture was stirred for about 30 minutes at a pH of about 5.8. The aqueous protein extract was separated from residual solid matter.

The extract was concentrated on an ultrafiltration unit using a "ROMICON" (Trademark) type XM50 and a Romicon type PM50 cartridge for a time sufficient to achieve a volume reduction factor of four times. The Romicon ultrafiltration cartridges are manufactured by Rohm and Haas Company, the designation "50" referring to a molecular weight cut-off of 50,000 Daltons.

The concentrate was diluted into cold water having a temperature of 7° C. to an ionic strength of 0.1 molar whereupon a white cloud of protein isolate formed in the dilution system. The protein dispersion was allowed to settle as a highly viscous amorphous gelatinous precipitate (wet PMM) in the bottom of the dilution vessel. The wet PMM was separated from the residual aqueous phase.

198 g of wet PMM were mixed with 2 g of cornstarch and the pH adjusted to 5.6. The starch-PMM mixture was centrifuged at 5000×g for 5 minutes at 20° C. to remove excess water and entrapped air.

The mixture was loaded into a fibre-forming apparatus comprising an elongate tube having a plurality of orifices of diameter 0.020 inches at the lower end and an air pressure inlet at the upper end. The orifices were immersed in a hot water bath having a temperature of about 95° C. and the mixture was extruded through the orifices downwardly into the hot water bath using 12 psi air pressure. The fibres were extruded for three minutes and allowed to heat set for a further two minutes before removal from the hot water bath. The fibres were smooth, elastic and even, compared with lumpy, twisted and inelastic fibres produced from the PMM without added starch.

Testing of the strength of the fibres was effected in a gel matrix. The basic gel was formed from a 20% w/w dispersion of soy PMM at pH 5.5 and 0.3M NaCl. Fibres were cut to ¼-inch lengths and incorporated into the dispersion to a concentration of 4 g of fibres to 30 ml of dispersion. The mixture of protein isolate dispersion and fibre pieces was heat set in a greased stainless steel gel tube of dimensions 2½ in. × ⅜ in. I.D. at 100° C. for 45 minutes and then cooled to 20° C. for 20 minutes.

The shear strength of the gels was measured using the Warner-Bratzler apparatus, which is described in detail in an article entitled "Modification Of Texture Instruments" by P. W. Voisey, J. of Texture Studies, 2 (1971), p.129 to 195.

Example 2

This example illustrates the effect of starch on fibre strength and fibre moisture content.

(a) The procedure of Example 1 was repeated for the formation of protein fibres and for the determination of shear strength. The initial protein extraction was effected at 0.3M NaCl and pH 5.55 and the PMM had a pH of 5.55 prior to extrusion. Varying quantities of starch were incorporated into the PMM and the fibre moisture content was determined in each case.

The results obtained are reproduced in the following Table I below:

TABLE I

| Sample | Shear Force (kg) | Fiber Moisture (wt %) |
| --- | --- | --- |
| Base Gel | 1.9 | — |
| PPM + wt % starch | 2.8 | 66.7 |
| + 1 wt % | 4.7 | 66.2 |
| + 5 wt % | 2.8 | 72.1 |
| + 10 wt % | 2.3 | 78.3 |
| + 15 wt % | 1.9 | — |
| + 20 wt % | 1.8 | 83.8 |

The results of the above Table I show that a small quantity of starch significantly increases the fibre strength and perceived toughness but the strength drops off at greater concentrations of starch, until in the 15 to 20 wt% range the fibres do not increase the strength of the base gel.

As can also be seen from the results of Table I, the moisture content and perceived juiciness of the fibres increases with increasing starch concentration. The fibres produced at 15 to 20 wt% starch are quite soft and, though of low strength, are suitable for seafood analog use where soft fibres are desirable and strength is less of a factor.

(b) The effect of starch on fibre moisture was again tested following the procedure of Example 2(a), except that in this case the pH of the PMM extruded was 5.65. The moisture content of the PMM and starch mixture prior to extrusion also was determined. The results obtained are reproduced in the following Table II:

TABLE II

| Starch (wt %) | PMM Moisture (%) | Fiber Moisture (%) |
| --- | --- | --- |
| 0 | 56 | 64 |
| 5 | 62 | 73 |
| 10 | 58 | 72 |
| 15 | 56 | 80 |
| 20 | 55 | — |
| 25 | 54 | 85 |

It will be seen from the results of Table II that increasing the amount of starch in the PMM and starch mixture decreases the overall moisture content of the mixture while the moisture content of the fibres produced from such mixtures increases significantly.

(c) The effect of low concentrations of starch and pH of PMM on the strength of fibres produced was tested by producing fibres under variable conditions following the procedure of Example 2(a). The results obtained are reproduced in the following Table III:

TABLE III

| Starch (wt %) | Shear Strength (kg) pH 5.55 | 5.65 |
| --- | --- | --- |
| 0 | 3.8 | 3.3 |
| 0.5 | 3.8 | 3.4 |
| 1.0 | 3.7 | 3.6 |
| 1.5 | 4.2 | 3.9 |
| 2.0 | 3.6 | 4.5 |
| 2.5 | 3.6 | 4.2 |
| 3.0 | 3.5 | 3.7 |
| 4.0 | 3.6 | 3.1 |
| Base Gel | 2.3 | 1.9 |

The results of the above Table III demonstrate that the quantity of starch required to achieve a maximum of shear strength varies with pH. The apparent discrepancy between the results shown in Table III with those set forth in Table I is explained by variation in properties based on differences within batches of PMM. However, it will be seen from the data presented in Tables I and III that the incorporation of about 1 to 2.5 wt% of starch achieves an increase in fibre strength.

These experimental determinations were confirmed by subjective organoleptic evaluation.

Example 3

This Example illustrates the use of different starches in fibre formation.

The effect of starch from various sources on fibre formation was tested. Fibres were produced from soy PMM of pH 5.65 containing 5 wt% starch following generally the procedure of Example 1.

As may be seen from the results reproduced below in Table IV, when a gellable starch was used, good flow characteristics were observed with the formation of smooth, elastic and uniform fibres, whereas the absence of fibre formation was observed when a pregelatinized starch material was used.

The results are reproduced in the following Table IV:

TABLE IV

| Starch | Observations |
|---|---|
| Tapioca | good flow |
| Pea | good flow |
| Corn | good flow |
| Pregelatinized Maize | no fiber formation |

Example 4

This Example illustrates the effect of pH of PMM on fibre strength.

Fibres were formed from soy PMM following generally the procedure of Example 1 with variation of the pH of the PMM samples extruded into the hot water bath. In the absence of added starch, at lower pH values, the lower moisture content of the PMM led to uneven flow and the production of fibres that were lumpy and lacking in strength.

With the addition of cornstarch, flow was improved and elastic, smooth and even fibres were obtained. The shear strength of the fibres was determined in each case and the results are reproduced in the following Table V:

TABLE V

| | Shear Strength (kg) Starch Concentration (%) | | |
|---|---|---|---|
| pH | 0 | 5 | 10 |
| 5.4 | 1.2 | 2.7 | 2.4 |
| 5.5 | — | 2.9 | 2.6 |
| 5.55 | — | 3.0 | 2.4 |
| 5.6 | 2.2 | 2.6 | 2.2 |
| 5.7 | — | — | 1.9 |

As may be seen from the results of Table V, in the absence of added starch, the maximum fibre strength was at pH 5.6 and strength decreases occur with decreasing pH, whereas additions of starch produced fibres of similar strength throughout the pH range.

Example 5

This Example illustrates the effect of temperature and starch on the viscosity of PMM.

Soy PMM produced by the procedure of Example I at pH 6.0 was tested for viscosity using a Haake Rotovisco RV 100 rotational viscometer at a shear rate of 98 sec$^{-1}$ at various concentrations of added starch and at various temperatures.

The results obtained are reproduced in the following Table VI:

TABLE VI

| Sample wt % Starch | Viscosity (Pa. sec) | | |
|---|---|---|---|
| | 30° C. | 40° C. | 50° C. |
| 0 | 1.22 | — | 2.70 |
| 1 | 2.09 | 3.48 | 4.53 |
| 5 | 9.40 | 6.62 | 5.05 |
| 10 | 14.88 | 9.14 | 4.09 |
| 20 | 15.41 | 9.14 | 5.05 |

As may be seen from the results of Table VI, the addition of starch increased the viscosity at 30° C. While at 0 and 1% starch, increasing the temperature increased the viscosity of the PMM, at higher starch concentrations, however, the viscosity decreased rapidly with temperature.

Example 6

This Example illustrates the utilization of PMM from other protein sources in the production of protein fibres.

Fababean PMM and pea PMM, formed using the procedure of Example 1 with 0.35M sodium chloride and pH 5.8 in the extraction of the protein, were used to form fibres in the presence and absence of added starch by the fibre-forming operation of Example 1.

In each case, the presence of the starch resulted in an even flow of the PMM-starch mixture into the hot water bath and the formation of smooth, elastic and even fibres.

SUMMARY OF DISCLOSURE

In summary of this disclosure, the present invention provides an improved procedure of formation of protein fibres of a wide range of properties by the addition of starch to protein micellar mass prior to extrusion of the fibres from the mixture into a coagulating medium. Modifications are possible within the scope of this invention.

What we claim is:

1. A process for the production of protein fibres, which comprises:
    (a) forming an aqueous dispersion of protein micelles consisting of amphiphilic protein moieties from at least one vegetable protein source material,
    (b) settling said aqueous dispersion of protein micelles to provide an amorphous protein mass containing a substantially undenatured protein isolate, said isolate having substantially no lipid content, substantially no lysinoalanine content and substantially the same lysine content as the storage protein in the protein source material,
    (c) admixing a gellable starch with said substantially undenatured vegetable protein isolate to form an admixture of said gellable starch and said protein isolate which contains from about 0.5 up to about 30 percent by weight of starch, and
    (d) injecting said admixture to form extruded fibers through at least one opening into a hot coagulating medium having a sufficient temperature to effect denaturation of the protein isolate and maintain structural integrity of the extruded fibres.

2. The process of claim 1 wherein said coagulating medium has a temperature of at least about 90° C.

3. The process of claim 1 wherein said coagulating medium has a temperature of at least about 95° C.

4. The process claimed in claim 1 wherein said coagulating medium is water.

5. The process of claim 4 wherein said water has a pH of about 5.5 to about 7.5.

6. The process of claim 1 wherein there comprises a plurality of openings having a diameter of about 0.005 to about 0.020 inches.

7. The process of claim 1 wherein the concentration of starch is about 0.5 to about 5 wt% of the protein isolate.

8. The process of claim 7 wherein the concentration of starch is about 1 to about 2.5 wt%.

9. The process of claim 2 wherein the concentration of starch is about 5 to about 30 wt% of protein isolate and said admixture is preheated to a temperature of about 40° to about 60° C. prior to injection into said water.

10. The process of claim 1 wherein said isolate has a pH of 5.55 to 5.85.

11. The process of claim 1 wherein said starch is cornstarch.

12. The process of claim 1 wherein said coagulating medium is water having a pH of about 5.5 to about 7.5 and there is a plurality of openings having a diameter of about 0.005 to about 0.020 inches and the pH of the isolate is 5.55 to 5.85.

13. The process of claim 12 wherein the concentration of starch is about 0.5 to about 5 wt% of the protein isolate.

14. The process of claim 13 wherein the starch is cornstarch.

15. The process of claim 12 wherein the concentration of starch is about 5 to about 30 wt% of protein isolate and said admixture is preheated to a temperature of about 40° to about 60° C. prior to injection into said water.

16. The process of claim 15 wherein the starch is cornstarch.

17. A process for the production of protein fibres from a protein source material, which comprises:
 (a) forming an aqueous dispersion of protein micelles consisting of amphiphilic protein moieties from at least one vegetable protein source material by solubilization of said protein source material in aqueous food grade salt solution and subsequent dilution of the protein solution,
 (b) settling said aqueous dispersion of protein micelles to provide an amorphous protein mass containing a substantially undenatured protein isolate having a pH of 5.55 to 5.85, said isolate having substantially no lipid content, substantially no lysinoalanine content and substantially the same lysine content as the storage protein in the protein source material,
 (c) separating the amorphous protein mass from residual aqueous phase,
 (d) admixing the separated amorphous protein mass with gellable starch to form an admixture of said protein mass and said gellable starch containing about 0.5 to about 5% by weight of the starch,
 (e) injecting said admixture through a plurality of openings having a diameter of about 0.005 to about 0.020 inches into water having a temperature of at least about 90° C. to form fibres by coagulation, and
 (f) removing the fibres so produced from the hot water.

18. The method of claim 17 wherein said aqueous dispersion of protein micelles from which said isolate is settled is formed by solubilizing the protein in said at least one vegetable protein source material using a food grade salt solution having a concentration of at least 0.2 molar ionic strength and a pH of 5.5 to 6.3 to form a protein solution, and diluting the protein solution to an ionic strength of less than 0.1 molar to cause formation of said dispersion.

19. the method of claim 17 wherein said aqueous dispersion of protein micelles from which said isolate is settled is formed by solubilizing the protein in said at least one vegetable protein source material using a food grade salt solution having a concentration of at least 0.2 molar ionic strength and a pH of about 5 to about 6.8 to form a protein solution, increasing the protein concentation of said protein solution while maintaining the ionic strength thereof substantially constant, and diluting the concentrated protein solution to an ionic strength below about 0.2 molar to cause formation of said dispersion.

20. The method of claim 19 wherein said food grade salt solution has an ionic strength of about 0.2 to about 0.8 molar, a pH of about 5.3 to about 6.2, said protein concentration step is effected by a membrane technique at a volume reduction factor of about 1.1 to about 6.0, as determined by the ratio of volume of protein solution and the volume of concentrated protein solution, and the dilution of the concentrated protein solution is effected by passing the concentrated protein solution into a body of water having a temperature below about 25° C. and a volume sufficient to decrease the ionic strength of the concentrated solution to a value of about 0.06 to about 0.12 molar.

21. The method of claim 20 wherein said protein source material is soybeans, said food grade salt is sodium chloride and said aqueous food grade salt solution further contains about 0.001 to about 0.01M of calcium chloride.

22. The method of claim 17 wherein said dispersion of protein micelles from which said isolate is settled is formed by solubilizing the protein in soybeans at a temperature of about 15° C. to about 75° C. using a food grade salt solution having a concentration of at least 0.2 molar ionic strength and a pH of about 5.6 to about 7.0 to form a protein solution, adjusting the pH of the protein solution to a pH of about 4.8 to about 5.4, and diluting the pH-adjusted solution to an ionic strength value sufficiently low to cause formation of said dispersion.

23. The method of claim 22 wherein said solubilization pH is about 6.0 to about 6.4 and said adjusted pH is about 5.1 to about 5.3.

* * * * *